United States Patent [19]

Blomberg

[11] 3,884,989

[45] *May 20, 1975

[54] COMPOSITION, PROCESS AND ARTICLE

[75] Inventor: Richard N. Blomberg, Wilmington, Del.

[73] Assignee: E. I. du Pont de Nemours & Company, Wilmington, Del.

[ * ] Notice: The portion of the term of this patent subsequent to Mar. 28, 1989, has been disclaimed.

[22] Filed: Jan. 20, 1971

[21] Appl. No.: 108,216

Related U.S. Application Data

[63] Continuation-in-part of Ser. No. 747,123, July 24, 1968, abandoned.

[52] U.S. Cl............... 260/857 R; 260/30.8 R; 260/32.6 NA; 260/32.6 NR; 260/858
[51] Int. Cl............................................. C08g 41/04
[58] Field of Search ....... 260/32.6 N, 329, 857, 858

[56] References Cited
UNITED STATES PATENTS

| | | | |
|---|---|---|---|
| 3,225,011 | 12/1965 | Preston | 260/78 |
| 3,296,213 | 1/1967 | Dreston | 260/78 |
| 3,382,305 | 4/1968 | Breen | 264/171 |
| 3,472,819 | 10/1969 | Slephens | 260/78 |
| 3,538,059 | 11/1970 | Beerman | 260/78 |
| 3,541,067 | 11/1970 | Pikl | 260/78 |
| 3,542,719 | 11/1970 | Pollack | 260/32.6 |
| 3,575,933 | 4/1971 | Hoegger | 260/78 |
| 3,591,673 | 6/1971 | Pollack | 264/176 |
| 3,600,350 | 8/1971 | Kwolek | 260/32.6 |

Primary Examiner—Joseph L. Schofer
Assistant Examiner—P. R. Michl

[57] ABSTRACT

Synthetic organic matrix polymers containing up to 25% by weight of poly(1,4-benzamide) as an immiscible reinforcing polymer are disclosed. These reinforced polymers are suited for use in fiber form with the reinforcing polymer providing an improvement in fiber properties. Preferred polymers and fiber-forming processes are also described.

3 Claims, No Drawings

COMPOSITION, PROCESS AND ARTICLE

RELATED APPLICATIONS

This application is a continuation-in-part of my application Ser. No. 747,123, filed July 24, 1968, now abandoned.

BACKGROUND OF THE INVENTION

The tensile properties of fibers formed from synthetic organic polymers may be modified by incorporating finely divided particles of incompatible synthetic organic polymers or inorganic material. The degree of reinforcement achieved will be determined by the strength of the reinforcing material as well as its ability to adhere to the matrix polymer. Organic polymers commonly employed for reinforcement applications exhibit adequate adhesion to the matrix but do not possess the strength and creep resistance required to achieve a substantial degree of tensile reinforcement, especially at temperatures above 90°C. Although inorganic materials, such as glass, metal, and refractory oxides possess the required strength and modulus, these properties are often not transmitted to the composite fiber due to the low degree of adhesion between reinforcing agent and matrix. When the filaments are drawn in an attempt to orient the matrix polymer molecules and achieve optimum tensile properties, the reinforcing agent often separates from the matrix at the interface. The poor adhesion results in voids and deterioration of the internal fiber structure.

SUMMARY OF THE INVENTION

The novel polymeric compositions of this invention comprise:

1. fiber-forming synthetic organic matrix polymer, and
2. up to about 25%, based on the weight of the matrix polymer, of a reinforcing polymer characterized by recurring units of the formula:

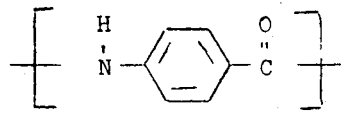

the reinforcing polymer being in the form of solid acicular particles having a length of less than about 10 microns, having a length-to-width ratio greater than about 2:1. The inherent viscosity of the reinforcing polymer should be at least about 0.6 measured as hereinafter described. The composition is preferably in the form of an intimate and homogeneous blend comprising the matrix and reinforcing polymer.

The matrix polymer is preferably selected from among polyamides, polyesters, spandex polymers, and polyacrylics, with the proviso that matrix and reinforcing polymers must not constitute a single phase when both are in the solid state. The matrix polymer can be present as a melt, in a solution or as a plasticized dispersion.

The matrix and reinforcing polymers may, together with a suitable liquid medium, form a dope. The term "dope" as used herein, refers to a composition which may comprise an isotropic phase, anisotropic phase, a gel phase, a solid phase, or an emulsion of these phase in any proportion or degree of dispersion. These dopes are preferably fiber-forming, extrudable compositions which may comprise more than one of the above phases. If a gel or solid phase exists, the material should be finely divided; the solid phase is preferably solid acicular particles, as described more fully hereinafter.

The matrix and reinforcing polymers may alone comprise a suitable blend. A preferred composition consists essentially of a melt-spinnable matrix polymer having solid acicular reinforcing particles dispersed therein.

The present invention also encompasses novel two-phase reinforced fibers that are spun using the polymeric compositions described hereinabove. Acicular particles of reinforcing polymer are distributed in a substantially uniform manner throughout the length and cross section of the fibers, which in turn comprise one of the fiber-forming matrix polymers listed above.

The reinforced fibers of this invention exhibit markedly higher modulus and resistance to heat and moisture when compared with fibers of the same matrix polymer in which the reinforcing polymer is absent.

DETAILED DESCRIPTION OF THE INVENTION

Reinforcing Polymer Preparation

The essentially homopolymeric poly(1,4-benzamide) constituent of the compositions or dopes of this invention consists essentially of recurring units of the formula:

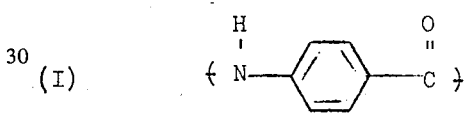

which may be readily obtained by certain polymerization techniques from suitable monomers dissolved in particular solvents, which may contain lithium chloride and chain terminating agents if desired.

Suitable monomers include p-aminobenzoyl halide salts of the formula:

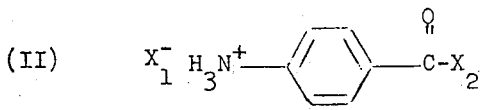

wherein $X_1^-$ represents a member selected from the group consisting of arylsulfonate, alkylsulfonate, acid sulfate, and halogen radicals, preferably bromide or chloride radicals, and $X_2$ represents a halogen radical, preferably bromide or chloride. p-Aminobenzoyl chloride hydrochloride is the preferred monomer. Other monomers suitable are p-aminobenzoyl bromide hydrobromide, p-aminobenzoyl chloride hydrobromide, p-aminobenzoyl chloride methanesulfonate, p-aminobenzoyl chloride benzenesulfonate, p-aminobenzoyl chloride toluenesulfonate, p-aminobenzoyl bromide ethanesulfonate, and p-aminobenzoyl chloride acid sulfate. Other monomers, not within formula (II), e.g., p-aminobenzoyl chloride sulfate, are also suitable. The preferred p-aminobenzoyl chloride hydrochloride may be prepared in high yield from an ethereal solution of p-thionylaminobenzoyl chloride by the general procedure of Graf and Langer, J. Prakt. Chem. 148, 161 (1937) under anhydrous conditions. The drying and anhydrous storage of this monomer are preferably performed under room temperature conditions because of the tendency of the compound to polymerize at higher temperatures.

Solvents which are suitable for the polymerization reaction include those selected from the group consisting of:
N,N,N',N'-tetramethylurea,
hexamethylphosphoramide,
N,N-dimethylacetamide,
N-methylpyrrolidone-2,
N-methylpiperidone-2,
N,N'-dimethylethyleneurea,
N,N,N',N'-tetramethylmalonamide,
N-methylcaprolactam,
N-acetylpyrrolidine,
N,N-diethylacetamide,
N-ethylpyrrolidone-2,
N,N-dimethylpropionamide,
N,N-dimethylisobutyramide,
N,N-dimethylbutyramide, and
N,N'-dimethylpropyleneurea.

Salts, such as lithium chloride, may be added to the polymerization reaction mixture; such addition may assist in the maintenance of a fluid mixture.

Chain terminators, as indicated above, may be used in these polymerizations. By assisting in the control of the molecular weight of the polyamide, the use of chain terminators contributes to the ease by which subsequent processing of the polymer occurs and enhances stability of the polymer dope for application in the hereinafter described "coupled" polymerization spinning process. Among the suitable chain terminators are monofunctional compounds which can react with the acid chloride ends of these polyamides such as p-aminobenzoic acid ammonia, monoamines (e.g., methylamine, dimethylamine, ethylamine, butylamine, dibutylamine, cyclohexylamine, aniline, etc.), compounds containing a single amide-forming group, such as N,N-diethylethylenediamine, hydroxylic compounds such as methyl alcohol, ethyl alcohol, isopropyl alcohol, phenol, water, etc., and monofunctional compounds which can react with the amine ends of the polyamides such as other acid chlorides (e.g., acetyl chloride), acid anhydrides (e.g., acetic anyhdride phthalic anhydride, etc.), and isocyanates (e.g., phenyl isocyanate, m-tolyl isocyanate, ethyl isocyanate, etc.). Useful difunctional terminators include terephthaloyl chloride, isophthaloyl chloride, sebacyl chloride, 4,4'-biphenyldisulfonyl chloride, pyromellitic dianhydride, p-phenylenediisocyanate, benzidine diisocyanate, bis(4-isocyanatophenyl) methane, p-phenylenediamine, m-phenylenediamine, benzidine, bis(4-aminophenyl) ether, N,N'-diaminopiperazine, adipic dihydrazide, terephthalic dihydrazide and isophthalic dihydrazide.

The polymerization reaction may be carried out by dissolving the desired monomer (as well as the chain terminating agent and lithium chloride, if any is used) in the desired amide solvent and vigorously stirring the resulting solution, externally cooled, until it develops into a viscous solution or a thick gel-like mass. Alternatively, the desired monomer may first be slurried in a small quantity of an anhydrous inert organic liquid, such as tetrahydrofuran, dioxane, benzene or acetonitrile, prior to the addition of the amide solvent. Preferably, the resulting monomer/organic liquid mixture is stirred at an increased rate and a relatively large volume of the amide solvent is rapidly added. In a further variation, the amide solvent may be frozen and mixed, while frozen, with the desired monomer. The solvent is permitted to thaw and the resulting mixture stirred until a viscous solution or gel-like mass forms.

In each of the above techniques, the polymerization reaction is maintained at low temperatures, i.e., under 60°C. and preferably from −15°C. to +30°C., by external cooling, if necessary. The reaction mixture is stirred continuously until it gradually develops into a viscous solution or thick gel-like mass. The reaction is generally allowed to proceed for a period of from about 1 to 48 hours, preferably from about 2 to 24 hours.

For the attainment of the highest molecular weights, these polymerizations are performed under strictly anhydrous conditions. The reaction vessel and auxiliary equipment, solvents, and reactants are carefully dried prior to use and the reaction vessel is continuously swept with a stream of dry, inert gas, e.g., nitrogen, during the polymerization.

The polymerization reaction may produce an acidic by-product (e.g., HCl or HBr) which is preferably neutralized. Neutralization is especially preferred in embodiments hereinafter described, wherein the reaction mixture is prepared for direct use in forming shaped articles of the polymer. In such a situation, it is preferred to add a base selected from the group consisting of:
lithium carbonate,
lithium oxide,
lithium hydroxide,
lithium hydride,
calcium oxide,
calcium hydroxide, and
calcium hydride,
or mixtures thereof, to neutralize the reaction mixture. The use of a neutralization agent is highly desired, in that the acid may cause significant corrosion problems in processing equipment (e.g., the spinneret); however, neutralization is not otherwise necessary. Neutralization may also be necessary to achieve more fluid compositions which facilitate the formation of shaped articles. If more than the stoichiometric amount of neutralizing agent is used an insoluble excess may remain. Its removal may be required prior to forming a shaped article (e.g., by spinning). The neutralizing agent may be added before, shortly after, or long after monomer is added to the reaction medium depending upon the inherent viscosity desired. Addition of neutralizing agent may result in a sharp increase in polymer molecular weight as determined by measuring the inherent viscosity of polymer isolated from an aliquot of the reaction mixture before and after neutralization.

In addition to excess neutralization agents, the dopes may contain other insoluble material which preferably should be removed, by conventional means, prior to forming a shaped article. For example, when the acidic polymerization system produces bromide ion and lithium hydroxide is used as a neutralizing agent, the lithium bromide produced may be insoluble in particular dopes and should be removed before the dope is spun or cast.

The dopes may be concentrated under vacuum to produce fluids of the desired solids content and/or viscosity for spinning or casting, under the conditions discussed hereinafter. To isolate the polymer, the polymerization mixture is combined with a polymer nonsolvent, e.g., water in a suitable blender, and thereby is converted to a powder. The powdered polymer, after being washed with both water and alcohol, is dried overnight in a vacuum oven at about 60°–90°C. before being stored or treated for subsequent processing.

The water resulting from neutralization may adversely affect the stability of some matrix polymers, and preferably should be removed. This is readily accomplished by heating the mixture at about 120°C. under reduced pressure.

The essentially homopolymeric poly(1,4-benzamide) reinforcing polymer useful in this invention possesses a peak height ratio of below 0.86 and, moreover, no sediment of polymer is seen when the polymer is subjected to the solubility test, all measured as described hereinafter. It will be understood, however, that the peak height ratio as measured on polymer that has been heated at elevated temperatures, and/or spun, may exceed 0.86. Solubility properties may also change on heating or spinning.

One particularly preferred reinforcing polymer form is solid acicular particles of poly(1,4-benzamide) having an inherent viscosity of between 0.8 and 1.8 measured as described hereinafter and a peak height ratio below 0.86. The particles exhibit lengths up to about 10 microns and the length-to-width (L/W) ratio is greater than about 2/1 (preferably 4:1 < L/W < 500:1). As used herein "length" refers to the particles' maximum dimension and "width" refers to the next smaller dimension, regardless of the shape of the particles.

The orientation angle ($2\theta p$) of the particles, determined as described hereinafter, is less than about 45° and the angular range ($2\alpha$) for minimum transmittance of polarized light, determined as described hereinafter, is in the range between 5° and 20°.

The particles, having the aforesaid properties, are prepared by precipitation of poly(1,4-benzamide) under specified conditions. The process comprises preparing a composition containing from about 3 to 6 weight percent of poly(1,4-benzamide) (based on the total weight of the composition), in an amide or urea medium, such as N,N,N',N'-tetramethyl urea (TMU) or N,N-dimethylacetamide (DMAc) containing between about 1 and 8 moles of lithium chloride for each mole of polymer. Optionally, the composition may also contain from about 2 to 16 moles of N,N-dimethylformamide (DMF) for each mole of polymer. A nonsolvent for the polymer, such as carbon tetrachloride, chloroform or benzene, is added under conditions designed to precipitate the particles.

The acicular particles employed in reinforcing textile denier filaments are preferably about four microns long. The particles are obtained by combining the reinforcing polymer, prepared as described hereinabove, with a 47:47:6 by weight TMU-dimethylformamide (DMF)-lithium chloride mixture to obtain a polymer concentration from about 3 to 6% by weight (preferably between 5 and 6%), which is then diluted to about 1.4 times its original volume with carbon tetrachloride, care being taken not to precipitate the polymer. The resulting mixture is stirred and carbon tetrachloride is slowly added to precipitate the polymer. The size of the particles will be determined by the shear rate produced by stirring the mixture, the quantity of lithium chloride present and the relative amounts of TMU and DMF. The non-solvent is preferably added above the surface of the reaction medium as a vapor to avoid agglomerating the particles, which may result from addition of the non-solvent in liquid form.

Although the polymer may exhibit an inherent viscosity greater than 0.8, as specified hereinbefore, this is an average value and may represent a wide range of molecular weight. Only the relatively high molecular weight portion is capable of yielding acicular particles that exhibit the degree of crystallinity required for high tensile properties. This high molecular weight material is less soluble than the low molecular weight fraction and will precipitate first. If the poly(1,4-benzamide) contains an appreciable amount of relatively low molecular weight and non-crystalline material, which is not readily crystallizable and which could cause agglomeration of the particles, it is preferable to stop the addition of carbon tetrachloride short of the point at which all of the polymer is precipitated. The particles of reinforcing polymer are then isolated from the solution and preferably washed with ethyl alcohol and then with water to remove a major portion of lithium chloride. If the solution contains low molecular weight polymer, the initial wash preferably comprises about a 6.6:3.3:0.1 weight ratio mixture of carbon tetrachloride:amide or urea:lithium chloride. This procedure will retain the low molecular weight polymer in solution, which would otherwise precipitate onto the surface of the particles, causing them to adhere to one another.

This acicular particle form of poly(1,4-benzamide) is particularly suitable for polymers that are usually extruded as a melt, such as polyamides and polyesters, as further discussed hereinafter.

Matrix Polymers

The matrix polymer is selected from the group of fiber-forming aliphatic and aromatic polyamides, polyesters, spandex polymers and polyacrylics, with the proviso that the matrix and reinforcing polymers must not constitute a single phase when both are in the solid state.

The term "polyamide" includes any long chain polycondensation polymer having recurring amide groups

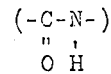

as an integral part of the polymer chain. Preferred polyamides include poly(hexamethylene adipamide) and poly(epsiloncaprolactam). Other polyamides such as those listed in U.S. Pat. Nos. 2,071,250; 2,071,251; 2,071,253; 2,130,523; 2,130,948; 2,190,770; 2,252,555; 2,252,557; and 2,374,137 are also suitable. Polyamides having an inherent viscosity greater than about 0.4, as measured in 90% formic acid at 30°C., are generally fiber-forming.

The term "polyester" includes any polycondensation polymer having recurring units of the formula

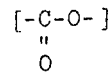

as an integral part of the polymer chain. The polyester is preferably a polymer of a glycol and a dicarboxylic acid in which the repeating structural units of the polyester contain at least one aromatic nucleus having chain-extending valence bonds separated by a minimum of four nuclear carbon atoms. Preferred polyesters include poly(ethylene terephthalate) and copolyesters derived from ethylene glycol, terephthalic acid and up to 15 mole per cent of some other dibasic acid. Polyesters having an inherent viscosity ($\eta$ inh) greater than about 0.6, as measured in a solvent comprising a 2:3 weight ratio of 1,1,2,2-tetrachloroethane: phenol at 30°C. using a polymer concentration of 0.5 g. per 100 cc. of solvent, are generally fiber-forming.

The term "spandex polymer" includes any long chain synthetic polymer comprised of at least 85 percent of a segmented polyurethane which is capable of manufacture into fiber form. The segmented polyurethane consists of segments of two classes alternating in the polymer chain. The segments of the first class in such a polymer are derived from a low-melting amorphous polymer such as a polyester, a polyether or a hydrocarbon polymer. The segments of the second class are at least one type of repeating unit of a crystalline, high-melting polymer, such as a polyurea, polyurethane, polyamide, bis-ureylene polymer or polyester. Spandex polymers such as those listed in U.S. Pat. Nos. 2,929,800; 2,929,801; 2,929,802; 2,929,803; 2,929,804; 2,953,839; 2,957,852; 2,962,470; 2,999,839; 3,111,368 and the like are suitable. Spandex polymers having an inherent viscosity ($\eta$ inh) greater than about 0.6, measured at 30°C., using a polymer concentration of 0.5 g. per 100 cc. of N,N-dimethylacetamide are generally fiber-forming.

The term "polyacrylic" includes any long-chain synthetic polymer comprised of at least 35 (and preferably 85) percent by weight of acrylonitrile units of the formula

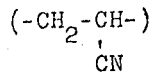

as an integral part of the polymer chain. As is well understood, the term includes the homopolymer of acrylonitrile and copolymers of acrylonitrile and monoethylenically unsaturated monomers polymerizable with acrylonitrile. Preferred comonomers include styrene, 2-vinylpyridine, 2-methyl-5-vinylpyridine, 4-vinylpyridine, methyl acrylate, sodium styrene sulfonates, vinylidene chloride, vinyl acetate, and the like. Such polyacrylics as exhibit an inherent viscosity ($\eta$ inh) greater than about 0.5, measured at 30°C. using a polymer concentration of 0.5 g. per 100 cc. of DMF are generally fiber-forming.

Matrix/Reinforcing Polymer Compositions

The form of reinforcing polymer employed in preparing the polymeric compositions of this invention will be determined by the choice of matrix polymer and the particular end use.

For compositions that are to be spun as a dope (e.g., polymers and copolymers of acrylonitrile) each of the polymers in the form of finely divided solid particles are combined with suitable liquid media to form a dope. Alternatively, dopes of each of the polymers may be combined. For matrix polymers which are soluble in a 95:5 by weight N,N,N',N'-tetramethylurea (TMU)-lithium chloride mixture (e.g., polyacrylonitrile) an alternative method for preparing the present spinnable compositions comprises polymerizing the desired concentration of the reinforcing polymer in the matrix polymer solution using TMU as a solvent. Following completion of polymerization, a homogeneous system is obtained in which the particles of reinforcing polymer exhibit widths below one micron. The relatively low concentration of reinforcing polymer makes a chain-stopping agent unnecessary. Lithium carbonate is added to neutralize the reaction medium and the resulting water is removed as described hereinbefore. The substantially anhydrous polymer mixture is then diluted with TMU-lithium chloride solution or concentrated as required to obtain the desired viscosity for a particular spinning technique.

Among the liquid media suitable for forming dopes of the reinforcing polymer, TMU is preferred; TMU containing lithium chloride is most preferred. Other liquid media containing at least about 2.5% of lithium chloride or calcium chloride (based on the total weight of reinforcing polymer-salt-liquid media) which are suitable include:

N,N-dimethylacetamide,
N,N-dimethylpropionamide,
N,N-dimethylbutyramide,
N,N-dimethylisobutyramide,
N,N-dimethyl methoxyacetamide,
N,N-diethylacetamide,
N,methylpyrrolidone-2,
N,methylpiperidone-2,
N-methylcaprolactam,
N-ethylpyrrolidone-2,
N,N-dimethylethyleneurea,
N,N-dimethylpropyleneurea,
N-acetylpyrrolidine, and
N-acetylpiperidine In the absence of lithium or calcium chloride the reinforcing polymer itself is essentially insoluble in the aforesaid liquid media (i.e., the solubility is less than 0.5 weight percent of the polymer therein), however dopes are readily formed when these salts are added to the mixture.

These liquid media may be used individually or in certain combinations (e.g., mixtures of N-methylpyrrolidone-2 and N,N-dimethylacetamide are suitable). Also these liquid media are suitable when used with less than 50 percent of particular other media, e.g., hexamethylphosphoramide.

In some embodiments of the invention, dopes containing the matrix and reinforcing polymers are prepared in the same liquid medium. However, as illustrated in the Examples, more than one liquid media may be employed e.g., the reinforcing polymer and a liquid medium forming a first dope, and its matrix polymer and a second liquid medium forming a second dope. A single dope of this invention is thereafter formed containing the two polymers and the two dissimilar liquid media. Suitable liquid media for forming the matrix polymer drops are well known in the art; exemplary media are shown in the Examples.

For matrix polymers (e.g., most polyamides and polyesters) that are to be spun as a melt, the reinforcing polymer should be present in the form of solid acicular particles, previously described, with the particles preferably being uniformly dispersed through the melt.

Generally less than about 25% by weight of the reinforcing polymer based upon the weight of matrix polymer should be used. Greater than 25% by weight generally reduces the maximum attainable draw ratio below the value required to develop the degree of orientation that can be achieved in the absence of reinforcing polymer. The optimum concentration of reinforcing polymer is generally determined by the properties of the matrix polymer. For example, for matrix polymers (e.g., most polyamides, polyesters and polyacrylics) having an initial modulus ($M_i$) of greater than about 10 grams/denier, at least about 10 weight per cent of the reinforcing polymer most significantly improves the properties of a fiber prepared from such a composition. However, as little as about 1 weight per cent or less of reinforcing polymer significantly improves the initial modulus of spandex polymers (e.g., having an initial modulus of about 0.01-0.05).

Preparation of Reinforced Articles

Melts or dopes of matrix and reinforcing polymer described in the preceding specification may be formed into shaped articles (e.g., fibers and films) using solution or melt shaping techniques.

Solution spinning is accomplished by conventional wet- and dry-spinning techniques.

Draw ratios of 2X or better can be obtained with wet spun fibers containing up to 20% by weight of reinforcing polymer. A similar draw ratio can be obtained with dry spun fibers containing up to 25% by weight of the reinforcing polymer, these percentages being based on total polymer concentration.

A high reinforcement efficiency in melt spun fibers is achieved when the reinforcing polymer is in the physical form previously described (solid acicular particles). If the reinforcing polymer is in one of the other physical forms, i.e., plasticized epuidimensional particles, it has been found that interruptions in the spinning operation are more likely to occur, and the modulus of the fibers is low when compared with fibers prepared using the solid acicular particles described above. Generally the solid particles constitute less than about 15% by weight of the melt and less than about 10% by weight is preferred when a drawability characteristic of the unreinforced fiber is desired. For example, poly(hexamethylene adipamide) is normally drawn 5X (500% of its as-spun length) to improve the fiber's tensile properties. When up to 10% by weight of reinforcing polymer is incorporated into this matrix polymer, a 5X draw is still attainable.

Reinforced Fibers

The size and shape of the particles of reinforcing polymer in fibers spun from the polymer compositions of this invention will vary with the procedures used in preparing the reinforcing polymer and the amount by which the as-spun fibers are drawn, although all the particles are generally acicular in form with L/W ratios that usually exceed 2:1 regardless of their dimensions in the spinning composition.

The present fibers exhibit levels of modulus, heat, and moisture resistance that are markedly higher than similar fibers in which the reinforcing polymer is absent. These properties of particular composite filaments (e.g., polyacrylic matrix fibers) are further improved by heat treating the filaments while maintaining them in a taut condition at temperatures of 200°-215°C. for periods up to 0.25 hour.

Sonic modulus measurements indicate the modulus of the reinforced fibers to be less affected by temperature than is the modulus of unmodified fibers. Additionally, the high degree of bonding that appears to be present between matrix and reinforcing polymers has not been apparent with other reinforcing agents. A procedure and apparatus for carrying out sonic modulus measurements is described in an article by W. H. Charch and W. W. Moseley, Jr., that appeared in the July, 1959, issue of the *Textile Research Journal*. For the purpose of the present invention the sonic modulus ($M_s$) in grams per denier is equal to 11.3 times $C^2$ where C is the velocity in kilometers/second of a given sound wave at the temperature and relative humidity specified. C is measured using a constant frequency of 10 kilocycles/second which is transmitted as pulses of 100 microseconds duration at a repetition rate of 60 pulses/second.

MEASUREMENTS AND TESTS

Optical Path Difference (O.P.D.) and Angular Variation ($2\alpha$)

The optical path difference (O.P.D.) of light vibrating parallel and perpendicular to the longitudinal particle axis is measured with white light and a polarizing microscope equipped with a three order Berek compensator. The sample is mounted in an oil exhibiting a refractive index of 1.63.

The angle between the analyzer (or polarizer) of the microscope and the longitudinal axis of the particle at which minimum light transmittance occurs is observed at various areas throughout the particle. The number of degrees over which minimum transmittance occurs for a given particle is reported as the angular variation ($2\alpha$).

Particle Dimensions: Particle dimensions greater than about 0.2 microns, are measured using an optical microscope. The thickness of a given particle ($T_p$), in microns, is calculated using equation 1.

(1) $$T_p = \frac{O.P.D.}{\Delta p}$$

O.P.D. = optical path difference in microns
$\Delta p$ = birefringence of particle
The O.P.D. is measured as previously described. The birefringence ($\Delta p$) of the particle is in turn calculated using Herman's equation (equation 2).

2. $\Delta p = \Delta t(1-3/2 \sin^2 \theta p)$ $\Delta t$ = birefringence of a perfectly ordered polymer sample
$\theta p$ = one-half the value of the orientation angle ($2 \theta_p$) of the particle Angle $\theta p$ is obtained, as described hereinafter, from the electron diffraction pattern of the particle.

Theoretical birefringence ($\Delta t$) of a perfectly ordered polymer sample is obtained using the following equation (equation 3), 3. $\Delta t = \Delta_f (1-3/2 \sin^2 \theta_f)$ wherein $\Delta_f$ and $\theta_f$ represent the birefringence (measured using an interference microscope) and one-half the orientation angle (measured using X-ray diffraction) respectively, of a crystallized filament prepared from poly(1,4-benzamide). The filament is crystallized by heating it at about 540°C. for about 6 seconds. The polymer is prepared as described in the preceding specification.

Inherent Viscosity: Inherent viscosity ($\eta$ inh) is determined in accordance with the following equation:

$$\eta\text{inh} = \frac{\ln(\eta\text{ rel})}{C}$$

wherein ($\eta$ rel) represents the relative viscosity and (C) represents the weight (in grams) of the polymer in 100 ml. of the solvent. The relative viscosity ($\eta$ rel) is determined by dividing the flow time in a capillary viscometer of a dilute solution of the polymer by the flow time for the pure solvent. Unless otherwise specified, the dilute solutions used herein for determining ($\eta$ rel) have C equal to 0.5 and flow times are determined at 30°C. The solvent employed for poly(1,4-benzamide) is concentrated (95–98%) sulfuric acid. The solvents employed for the various matrix polymers are specified in the following examples.

Peak Height Ratio: A measure of the relative intensity of the two major equatorial diffraction peaks is given by the peak height ratio (PHR). A suitable method for determining the PHR involves the use of a reflection technique to record the the intensity trace of the X-ray diffraction pattern with an X-ray diffractometer. Approximately 0.5 gram of water- and amide- or urea-free polymer is pressed into a sample holder under an applied pressure of 3,125 lb./in.$^2$ (219.8 × 10$^3$ g./cm.$^2$). Using CuK$\alpha$ radiation, a trace of the intensity is recorded from 6° to 40°, 2$\theta$, and with 0.5° slits, at a scanning speed of 1°, 2$\theta$, per minute, a chart speed of 1 inch (2.54 cm.) per minute, and a time constant of 2; 2$\theta$, being the angle between the undiffracted beam and the diffracted beam. The full scale deflection of the recorder is set so that the peak with maximum intensity is at least 50% of the scale, which is a linear scale. To calculate the PHR, a base line is first established on the diffractometer scan by drawing a straight line between the points on the curve at 8° and 28°, 2$\theta$. Vertical lines (at constant 2$\theta$ values) are drawn from the peaks in the vicinity of 20.3° and 23.4°, 2$\theta$, to the base line, and the height of the peaks, in chart divisions, above the base line is ascertained. The PHR is then calculated from the equation $$PHR = \frac{A}{B}$$

where A=height of the peak, approximately located at 20.3°, 2$\theta$, above the base line in chart divisions, B=height of the peak, approximately located at 23.4°, 2$\theta$, above the base line in chart divisions.

Orientation Angle: The orientation angle (2$\theta_p$) of the poly(1,4-benzamide) particles are reported as the angle between half-maximum intensity points on the equatorial reflection of the electron diffraction pattern. All values listed represent an average obtained using four particles.

Solubility Test: To a solution of 1.0 g. of dry lithium chloride in 30 ml. of dry N,N-dimethylacetamide is added 0.5 g. of dry poly(1,4-benzamide) powder comminuted to a particle size of about 1 to 5 $\mu$. The tube is stoppered and its contents, heated at 60°–80°C., are subjected to stirring by a mechanical agitator for a period of from 10 min. to 4–5 hrs. If polymer particles remain visible, the contents of the tube are cooled to −70°C. (e.g., by immersion in a bath of solid carbon dioxide and acetone), then are allowed to warm up until stirring can be resumed, and are heated as above. The tube is then allowed to stand upright for a further 24 hours without stirring. After this time, no polymer residue lies settled on the bottom of the tube.

Fiber Tensile Properties: Fiber properties of tenacity, elongation, and initial modulus, are coded as T/E/Mi, and are reported in their conventional units, grams/denier percent, grams/denier, respectively. Denier is coded as Den.

Tensile properties are determined on individual fibers which measured one inch (2.54 cm.) in length, unless otherwise specified, between the jaws of an Instron tester (product of the Instron Engineering Corporation, Canton, Mass.) and which are subjected therein to a load sufficient to cause elongation to occur at the rate of 60% per minute measured at 21°C. and 65% RH.

Creep and Growth: "Creep" and "growth" are determined by placing a loop of 800 denier yarn in a chamber at 160°C. under dry conditions (substantially 0% relative humidity). The circumference of the loop is 20 inches (50 cm.) at ambient temperature and humidity. The length of the loop is then measured under a load of 0.1 g./denier (equivalent to 16 g.) which is sufficient to convert it to substantially a one-dimensional structure. With one end of the structure secured, a 1600-gram load is attached to the lower end of the loop and the yarn allowed to elongate. The amount of elongation is measured 30 seconds after loading and the measurement is repeated 29.5 minutes later. "Growth" is defined as the relative amount by which the loop elongated during the total 30 minutes, the elongation during the 29.5 minute period is referred to as "creep."

EXAMPLES

Several preferred embodiments of the present polymeric compositions, reinforced fibers, and associated preparative techniques are illustrated in the following nonlimiting examples. Parts and percentages are by weight unless otherwise indicated.

EXAMPLE I

This example illustrates a dry spun reinforced fiber prepared from an acrylonitrile copolymer and poly(1,4-benzamide), A polymer composition is prepared using 158 g. of a copolymer containing 93.6% by weight of acrylonitrile, 6% by weight of methyl acrylate and 0.4 by weight of sodium styrene sulfonate and 21.4 g. of lithium chloride which is dissolved in 428 g. of TMU. This is combined with a composition comprising 32 g. of poly(1,4-benzamide), $\eta$ inh = 1.44 having a peak height ratio below 0.86, prepared as described hereinabove, dissolved in a 92:8 weight ratio mixture of TMU-lithium chloride to form a 9.2% by weight solution. The mixture is dry spun through a 10 hole spinneret having orifice diameters of 0.005 inch (0.013 cm.). The temperature of the spinning dope is 83°C., the temperature of the nitrogen on the downstream side of the spinneret is 189°C. and the rate of nitrogen flow is 4 cu. ft./minute (113,000 cu. cm./min.). The fibers are wound up at a speed of 158 yd./min., (144 meters/minute), drawn 7X over a hot roll at 140°C., and heat treated in a taut condition at a temperature of 200°C. for 15 minutes. The tensile properties, T/E/Mi, of the resultant fibers, measured at 70°F. (21°C.) and 65% relative humidity (R.H.) are 3.2/14/107. The tensile properties measurements are performed using an Instron tester model TM- 11. The same properties measured at 194°F. (90°C.) and 100% R.H. are 1.2/56/6.5. Under the latter conditions the tensile properties of an unreinforced control fiber of the same matrix polymer are 0.69/103/1.8. (The control fiber is prepared by wet spinning a 20% by weight solution of the matrix polymer dissolved in DMAc and drawing the resultant fiber 6X.) Examination of these reinforced fibers with an electron microscope indicates that the component polymers constitute separate solid phases with the reinforcing polymer being in the form of solid acicular particles having a maximum dimension (length) of about 0.5 to 1 micron and next largest dimension (width) of about 0.25 micron.

EXAMPLE II

This example illustrates a dry spun reinforced fiber prepared from an acrylonitrile copolymer and a finely divided gel of poly(1,4-benzamide).

A solution comprising 100 g. of the copolymer described in Example I dissolved in 400 g. of DMF is combined with 25 g. poly(1,4-benzamide) $\eta$ inh = 0.72, having a peak height ratio below 0.86, dissolved in 225 g. of a 9:1 weight ratio mixture of TMU:lithium chloride. The resultant gel is diluted to 1.3 times its original weight using TMU and is fragmented in a colloid mill. Following the procedure of Example I, the mixture is dry spun and the fibers are drawn 7X in a steam atmosphere, and subsequently heat treated at 200°C. for 12 minutes. The tensile properties, T/E/Mi of the fibers at 70°F. (21°C.) and 65% R.H. are 4.6/16/83. The same values measured at 194°F. (90°C.) and 100% R.H. are 1.1/36/5.1. Examination of these fibers with an electron microscope indicates that the reinforcing and matrix polymers constitute separate solid phases with the reinforcing polymer being in the form of solid acicular particles having a maximum dimension (length) of about 1.5 2 microns and a next largest dimension (width) of about 0.5 micron.

EXAMPLE III

This example illustrates a wet-spun reinforced fiber prepared from an acrylonitrile copolymer and a finely divided gel of poly(1,4-benzamide).

A solution comprising 20 g. of the copolymer described Example I, dissolved in 80 g. of dimethyl sulfoxide, is combined with a composition containing 2 g. poly(1,4-benzamide), $\eta$ inch = 0.72, having a peak height ratio below 0.86, and 20 g. of a 90:10 weight ratio mixture of TMU:lithium chloride. The resultant gel is diluted to 1.6 times its original weight with TMU and is fragmented in a colloid mill. The mixture is wet spun through a 100 hole spinneret having orifice diameters of 0.003 inch (0.076 cm.) using a head temperature of 32°C. The spinning bath comprises a 1:1 mixture of DMF:water. The fibers are drawn 4X. The tensile ties, T/E/Mi of the fibers at 70°F. (21°C.) and 65% R.H. are 0.8/3/43. At 194°F. (90°C.) and 100% R.H. these values are 0.6/8/28.

EXAMPLE IV

This example illustrates in situ polymerization of the reinforcing poly(1,4-benzamide) in a dope of the acrylonitrile copolymer matrix and the wet spinning of fibers therefrom.

A polymer composition is prepared by dissolving 45 g. of the acrylonitrile copolymer of Example I in 408 g. of a 2% by weight solution of lithium chloride in TMU. This is combined with 20 g. of p-aminobenzoyl chloride hydrochloride. The resultant mixture is stirred for one hour to polymerize the monomer in about 70% yield and obtain a homogeneous system. Nine grams of lithium carbonate are added to neutralize the hydrogen chloride present and the dope is then concentrated to a consistency suitable for wet spinning. Fibers are then spun as described in Example III. The fibers are drawn 4.5X. The tensile properties, T/E/Mi measured at 70°F. (21°C.) and 65% R.H. are 2.5/13/90, respectively. When these measurements are carried out on the wet fibers at 194°F. (90°C.) and 100% R.H., the values obtained are 0.7/19/6. Examination of these fibers with an electron microscope indicates that the reinforcing and matrix polymers constitute separate solid phases with the reinforcing polymer being in the form of solid acicular particles having a maximum dimension (length) of about 0.25 micron and a next largest dimension (width) of about 0.127 micron.

The tensile properties of fibers prepared according to the procedures described in Examples I–IV are summarized in Table I. For purposes of comparison, the modulus is also calculated from sonic velocity measurements using the procedure of Charch and Moseley referred to in the preceding specification. At 100°C. the sonic moduli ($M_s$) of the reinforced fibers are not less than 0.66 of the values measured at 25°C. In contrast, the value of $M_{s\ 100°C}/M_{s\ 25°C}$ for an unreinforced control is 0.43.

Table I also shows the tensile properties of an unreinforced acrylonitrile copolymer. The polymer composition and spinning conditions are described hereinabove in Example I.

TABLE I

| Example | Draw Ratio | Tenacity(T) g./denier 21°C. | Tenacity(T) g./denier 90°C. | Elongation(E) % 21°C. | Elongation(E) % 90°C. | Initial Modulus(Mi) g./denier 21°C. | Initial Modulus(Mi) g./denier 90°C. | $M_s$100°C. | $M_s$100°C./$M_s$25°C. | Weight % Reinforcing Polymer in Filament |
|---|---|---|---|---|---|---|---|---|---|---|
| I | 7× | 3.2 | 1.2 | 14 | 56 | 107 | 6.5 | 73.6 | 0.688 | 17% |
| II | 7× | 4.6 | 1.1 | 16 | 36 | 83 | 5.1 | 55.9 | 0.673 | 17% |
| III | 4× | 0.8 | 0.6 | 3 | 8 | 43 | 28 | 28.7 | 0.668 | 9.1% |
| IV | 4.5× | 2.5 | 0.7 | 13 | 19 | 90 | 6 | 59.7 | 0.663 | 15% |
| Control | 6× | 2.8 | 0.7 | 21 | 103 | 56 | 1.8 | 24.9 | 0.429 | 0% |

EXAMPLE V

This example illustrates poly(1,4-benzamide) reinforced melt spun fibers of poly(hexamethylene adipamide) and acicular particles of poly(1,4-benzamide).

A polymer composition is prepared by molding a plug using a homogeneous mixture comprising 4 g. of solid acicular particles of poly(1,4-benzamide), $\eta$ inh = 1.0, in 36 g. of finely divided poly(hexamethylene adipamide) together with 750 cc. of water. The $\eta$ inh of a solution comprising 0.5 g. of matrix polymer per 100 cc. formic acid is 0.9, measured at 30°C. These poly(1,4-benzamide) particles exhibit a maximum width of 1 micron, a maximum length of about 4 microns, an orientation angle ($2\theta p$) of less than about 45°, and an angular variation ($2\alpha$) of between 5° and 20°, and are prepared as described in the foregoing specification. The composition is melted, filtered using an alumina filter pack and extruded through a spinneret having one hole, 0.010 in. (0.03 cm.) in diameter. The as-spun fiber is drawn 5X over a hot plate at 200°–215°C. At a temperature of 77°F. (25°C.) the fiber exhibits a T/E/Mi of 8.6/13/48. These values represent an average obtained from at least three trials. The tensile properties, T/E/Mi, of an unreinforced control fiber are 7.0/18/37. The reinforced fiber exhibits a growth of 2.04% and a creep of 0.27%, compared to values of 7.7% and 0.9%, respectively, for an unreinforced control.

The low creep and growth of the reinforced polyamide fibers make them eminently suitable for application requiring dimensional stability at temperatures up to 160°C. Examples of such applications are tire cord and reinforcement for V-belts.

EXAMPLE VI

This example illustrates reinforced melt spun fibers of poly(ethylene terephthalate) and acicular particles of poly(1,4-benzamide).

The procedure and relative quantities of Example V are employed with the exception that the matrix polymer is poly(ethylene terephthalate), $\eta$ inh = 1.1, measured at 30°C. using a solution comprising 0.5 g. of the matrix polymer per 100 cc. of solvent. The solvent is a 2:3 weight ratio mixture of 1,1,2,2-tetrachloroethane:phenol. The hot plate temperature is 130°C. The tensile properties of the drawn filaments at 77°F. (25°C.) are 4.5/16/113, compared to 4.1/21/99 for an unreinforced control.

EXAMPLE VII

This example illustrates a dry spun reinforced fiber prepared using poly(metaphenylene isophthalamide) and poly(1,4-benzamide).

A polymer solution is prepared using 833 g. of a solution containing 17 weight percent of poly(metaphenylene isophthalamide) (141.6 g.), $\eta$ inh = 1.5 prepared as taught in Kwolek et al., U.S. Pat. No. 3,063,966, 6% by weight of calcium chloride, 77% dimethylacetamide and 125 g. of a solution comprising a 94:6 by weight ratio of TMU-lithium chloride that contains 15.8 g. of poly(1,4-benzamide), $\eta$ inh = 1.4 having a peak height ratio less than 0.86. The mixture is dry spun through a 10 hole spinneret having an orifice diameter of 0.005 in. (.0127 cm.). The temperature of the spinning solution is 80°C.; the temperature of the nitrogen on the downstream side of the spinneret is 220°C. and the rate of nitrogen flow is 4.5 cu. ft./min. (0.13 m./min.). Fibers are wound up at a speed of 116 yd./min. (106 m./min.) and are then drawn 4.5X in a stream atmosphere at 10 p.s.i. (704 g./cm²) and crystallized at 350°C. on a hot plate. The tensile properties T/E/Mi of the resultant fibers, measured at 77°F. (25°C.), are 3.9/36/123, compared with 4.2/54/90 for an unreinforced control. These properties of the fibers measured at 571°F. (300°C.) are 1.4/18/50 compared with 1.3/36/8 for the control. Examination of these fibers with an electron microscope indicates that the reinforcing and matrix polymers constitutes separate solid phases with the reinforcing polymer being in the form of solid acicular particles having a maximum dimension (length) of about 0.5 to 1 micron and a next largest dimension (width) of about 0.25 micron.

EXAMPLE VIII

This example illustrates dry-spun reinforced fibers prepared using a spandex polymer and poly(1,4-benzamide).

A solution comprising 190 g. of dimethylacetamide and 110 g. of a spandex polymer prepared as described in U.S. Pat. No. 3,111,368, is combined with 0.55 g. of poly(1,4-benzamide) (having an inherent viscosity of 1.13, and a peak height ratio of less than 0.86) dissolved in 4.95 g. of a 94:6 weight ratio solution of TMU: lithium chloride. A solution comprising 0.5 g. of the spandex polymer per 100 cc. of DMAc exhibits an $\eta$ inh of 1.0 at 30°C. The resulting mixture is dry spun into a nitrogen atmosphere using the following spinning conditions:

head temperature — 70°C.
spinneret temperature — 131°C.
nitrogen temperature — 215°C.
column temperature — 218°C.

A spinneret with nine holes exhibiting a diameter of 0.005 inch (0.013 cm.) is employed.

At a temperature of 77°F. (25°C.) the fibers exhibit T/E/Mi 0.8/750/0.06. The same properties measured on an unreinforced control are 0.95/890/0.05.

The stress decay and tensile recovery are measured using a 10 g. load which is applied gradually to obtain an elongation rate of 50% per minute. These properties are 5% and 96%, respectively, for the reinforced sample; values for the unmodified control are 6% and 92%, respectively.

EXAMPLE IX

The example illustrates the melt spinning of poly(hexamethylene adipamide) containing a dope of poly(1,4-benzamide).

One hundred seventy eight grams of poly(hexamethylene adipamide) powder of about +60 mesh is combined with 183 grams of a dope of poly(1,4-benzamide) in N-methylpyrrolidone/lithium chloride (NMP/LiCl) to provide a 97.5/2.5 wt. % blend of poly(hexamethylene adipamide)/poly(1,4-benzamide) polymers. The dope is prepared by stirring 2.5 wt. % of poly(1,4-benzamide) ($\eta$ inh = 0.99) into NMP/LiCl (95/5 wt. %), cooling with dry ice for 2 hours and then heating to 100°C. for 2 hours with stirring. This mixture of blended polymers is heated on a hot plate (150°C.) to remove sufficient solvent and yields a tacky mixture which is then pressed into a plug using a mold temperature of 130°C. This plug is press spun at a spinneret temperature of 224°C. using a pressure of 6400 psi to yield continuous monofilaments. These filaments after being exposed to the atmosphere for about 4 weeks are drawn 4.5X on a 200°C. hot plate. The as-drawn filaments exhibit an average denier of 14.5 and exhibit average tensile properties of T/E/Mi of 4.2/12.8/29.0.

What is claimed is:

1. Fiber consisting essentially of a first solid phase consisting essentially of a synthetic organic fiber-forming matrix polymer selected from the group consisting of polyamides, polyesters, spandex polymers, and polyacrylics, and a second solid phase distributed throughout said matrix polymer and present in a reinforcing amount of from about 1% up to about 25% by weight, based upon the weight of said matrix polymer, consisting essentially of recurring units of the formula:

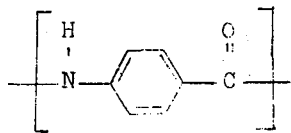

wherein said reinforcing polymer is in the form of solid acicular particles having a length of less than about 10 microns, having a length-to-width ratio greater than about 2:1.

2. Fiber of claim 1 wherein said reinforcing polymer constitutes less than about 20% by weight of said fiber.

3. Fiber of claim 1 wherein said reinforcing polymer constitutes less than about 10% by weight of said fiber.

* * * * *